No. 725,141. PATENTED APR. 14, 1903.
A. E. ROBINSON & C. F. LAUR.
SPEED CHANGING MECHANISM.
APPLICATION FILED OCT. 17, 1902.
NO MODEL. 5 SHEETS—SHEET 1.

No. 725,141. PATENTED APR. 14, 1903.
A. E. ROBINSON & C. F. LAUR.
SPEED CHANGING MECHANISM.
APPLICATION FILED OCT. 17, 1902.
NO MODEL. 5 SHEETS—SHEET 3.

No. 725,141. PATENTED APR. 14, 1903.
A. E. ROBINSON & C. F. LAUR.
SPEED CHANGING MECHANISM.
APPLICATION FILED OCT. 17, 1902.
NO MODEL. 5 SHEETS—SHEET 4.

Witnesses
Inventors

| EXTRA THREADS | | | | | | | |
|---|---|---|---|---|---|---|---|
| SET UPPER KNOB CENTRAL | | | | | | | T |
| THDS | KNOBS | UPPER | STUD | | LOWER | FEEDS | |
| | | | OUT | IN | | | |
| 1 | 1 | D | 48 | 24 | 48 | 24 | 4 |
| 1 1/8 | 2 | " | " | " | " | " | 4.6 |
| 1 3/16 | 3 | " | " | " | " | " | 4.6 |
| 1 1/4 | 4 | " | " | " | " | " | 5 |
| 1 3/8 | 5 | " | " | " | " | " | 5.5 |
| 1 7/16 | 6 | " | " | " | " | " | 5.6 |
| 1 1/2 | 7 | " | " | " | " | " | 6 |
| 1 5/8 | 8 | " | " | " | " | " | 6.5 |
| 1 3/4 | 9 | " | " | " | " | " | 7 |
| 1 7/8 | 10 | " | " | " | " | " | 7.5 |
| 2 | 11 | " | " | " | " | " | 8 |
| 32 | 1 | C | 36 | 36 | 24 | 48 | 128 |
| 36 | 2 | " | " | " | " | " | 144 |
| 38 | 3 | " | " | " | " | " | 152 |
| 40 | 4 | " | " | " | " | " | 160 |
| 44 | 5 | " | " | " | " | " | 176 |
| 46 | 6 | " | " | " | " | " | 184 |
| 48 | 7 | " | " | " | " | " | 192 |
| 52 | 8 | " | " | " | " | " | 208 |
| 56 | 9 | " | " | " | " | " | 224 |
| 60 | 10 | " | " | " | " | " | 240 |
| 64 | 11 | " | " | " | " | " | 256 |
| 64 | 1 | C | 24 | 48 | 24 | 48 | 256 |
| 72 | 2 | " | " | " | " | " | 288 |
| 76 | 3 | " | " | " | " | " | 304 |
| 80 | 4 | " | " | " | " | " | 320 |
| 88 | 5 | " | " | " | " | " | 352 |
| 92 | 6 | " | " | " | " | " | 368 |
| 96 | 7 | " | " | " | " | " | 384 |
| 104 | 8 | " | " | " | " | " | 416 |
| 112 | 9 | " | " | " | " | " | 448 |
| 120 | 10 | " | " | " | " | " | 480 |
| 128 | 11 | " | " | " | " | " | 512 |

UNITED STATES PATENT OFFICE.

ALBERT E. ROBINSON, OF COVINGTON, KENTUCKY, AND CHARLES F. LAUR, OF CINCINNATI, OHIO, ASSIGNORS TO THE AMERICAN TOOL WORKS COMPANY, OF CINCINNATI, OHIO, A CORPORATION OF WEST VIRGINIA.

SPEED-CHANGING MECHANISM.

SPECIFICATION forming part of Letters Patent No. 725,141, dated April 14, 1903.

Application filed October 17, 1902. Serial No. 127,636. (No model.)

*To all whom it may concern:*

Be it known that we, ALBERT E. ROBINSON, residing at Covington, in the county of Kenton and State of Kentucky, and CHARLES F. LAUR, residing at Cincinnati, in the county of Hamilton and State of Ohio, have invented certain new and useful Improvements in Speed-Changing Mechanism for Lathes and other Metal-Working Machinery, of which the following is a specification.

It is the object of our invention to provide new and improved speed-changing mechanism for machinery of the class described and a wide range of changes for such speed-changing mechanism and to provide speed-changing mechanism comprising primary speed-changing mechanism embracing a cone of gears and tumbler-gearing meshing with the respective gears of the cone, secondary speed-changing mechanism embracing clutch-engaged gearing and intermediate gears therefor, and tertiary speed-changing mechanism embracing auxiliary gearing for the latter, whereby the range of variations in speed is materially increased.

The lathe-bed is a heavy casting, and it is quite difficult to properly fit shafts therein in proper alinement the proper distances apart when fixed gears are employed; and it is therefore the object of our invention, further, to so construct, arrange, and combine the parts that a large part of the fitting may be done separate from the lathe-bed and the assembled parts attached to the lathe-bed in assembled form, and we accomplish this object by our improved construction; and our invention consists, therefore, further, in providing a supplemental frame or box on which the secondary and tertiary speed-changing mechanism may be assembled before attachment to the lathe and in making the gear connections of the secondary and tertiary speed-changing mechanism with the primary speed-changing mechanism at one end and with the live-spindle at the other end by means of tumbler-mounted gearing.

Our invention consists, further, in the parts and in the construction, arrangement, and combinations of parts hereinafter more fully described and claimed.

E is the lathe-bed or shears, longitudinally of which a carriage F is adapted to travel, movement being imparted to it by a lead-screw G.

H is the head-stock, in which the spindle I is journaled, motion being imparted to the spindle by means of a belt passing about the cone of driving-pulleys K. Ordinary back-gearing L may also be provided.

M is a gear on the spindle, through which motion is imparted to the lead-screw by trains of gearing and means which we will now describe. These trains of gearing include the primary speed-changing mechanism, the secondary speed-changing mechanism, and when desired the tertiary speed-changing mechanism.

N is a frame or box extending beyond the end of the lathe-bed, to which it is rigidly secured, as by means of bolts $n$ taking through feet $n'$ into the lathe-bed. This box is constructed separately from the lathe-bed and contains the instrumentalities hereinafter described which may be fitted therein before attachment to the lathe-bed, thus saving expense and providing convenience in the handling of parts. After fitting the box is attached to the lathe-bed, and the connections from the shafts in the box to the shafts in the lathe-bed at both ends of the train of shafts in the box are made by means of tumbler-gearing, so that exactness of fit between the box and the lathe-bed is dispensed with. The box N embraces the secondary speed-changing mechanism, which may be described as follows: A shaft 21 has gears 22 23 mounted thereon, so as to be capable of turning with relation thereto. These gears have elongated hubs 24 25, serving as journals in bearings 26 27 in the box N. A collar 28 is secured to the end of the hub 24 and takes against the bearing 26, and a collar 29 is secured to the end of the hub 25 and takes against the bearing 27, with the gears also taking against the inner ends of the bearings for the purpose of securing the gears longitudinally of the bearings. A gear 30 is rigidly secured to the inner end of the shaft 21, and a collar 31 is secured to the outer end of the shaft 21, thereby holding the shaft longitudinally of the gears and box. A clutch 32 is splined to the shaft 21 between the gears 22 and 23, with clutch members 34 35 between the clutch and the gear 22 and the clutch and the gear 23, respectively, for engaging either the gear 22 or 23, and thereby selectively securing it to the shaft 21. A clutch-lever 36 is pivoted to the box at 37, having a preferably forked arm 38 pivotally secured thereto, taking into an annular groove 39 in the clutch 32 for moving the clutch into engagement with either gear 22 or 23. The clutch-lever has an arm 40, with a retaining-pin 41, adapted to engage apertures A or B for securing the clutch in adjusted position. For instance, if it is desired to bring the clutch into engagement with the gear 22 the lever 36 is thrown sidewardly, causing the clutch members 34 to engage, the retaining-pin being caused to enter the aperture A for additional safety in retaining the clutch members in engagement, while for engagement of the clutch members 35 the lever is thrown toward the other side and the retaining-pin caused to engage the aperture B, while if it is desired to retain the clutch in neutral position the retaining-pin is caused to enter the aperture 43. A second shaft 50, about which we prefer to also mount the rocking or tumbler lever for the cone-gears, has gears 51 52 mounted loosely thereon. The gears 51 52 have elongated hubs 53 54, respectively journaled in the bearings 55 56 in the box N. They are held against endwise movement similarly to the gears 23, and the shaft 50 is also held against endwise movement. A clutch 57 is splined to the shaft 50. Clutch members 58 59 are between the clutch and the gears 51 and 52, respectively, with which the clutch is adapted to be selectively engaged for connecting either gear with the shaft 50 for causing the shaft to revolve with the gears. A third shaft 61 is secured in the bearings 62 63 in the box. Gears 64 65 66 are rigidly secured to a sleeve 67, which revolves on the shaft 61. The gear 64 meshes with the gear 51, the gear 65 meshes with the gear 22, and the gear 66 meshes with the gears 23 and 52. A clutch-lever 68 is pivoted in the box at 69 and has a forked arm 70 pivotally secured thereto, taking into an annular groove 71 in the clutch 57, and has an arm 72, with a retaining-pin 73, for taking into selected apertures C 75 D for retaining the clutch in engagement with either gear 51 or 52 or in neutral position between the gears. The gears 22, 23, 51, and 52, with the gears 64, 65, and 66, are arranged for imparting various speeds to the shaft 50 and, as shown, are arranged for causing the shaft 50 to revolve at four different speeds. Thus, first, if the clutches are caused to engage with the gears 22 and 52, throwing the clutch-levers into the positions A D, two revolutions of the shaft 50 are obtained for one of the shaft 21, because shaft 21 making one revolution the gear 22 will make one, the gear 65 will make one, being equal to 22, the gear 66, being rigidly secured to the same sleeve with the gear 65, will therefore make one revolution, and the gear 66, being twice the size of the gear 52, will cause the latter to revolve twice for its every revolution; second, if the clutches are caused to engage the gears 23 and 52, throwing the clutch-levers into the positions B D, one revolution of shaft 50 is obtained for each revolution of shaft 21; third, if the clutches are caused to engage the gears 22 and 51, throwing the clutch-levers into the positions A C, one half-revolution of shaft 50 is obtained for each revolution of shaft 21, and, fourth, if the clutches are caused to engage the gears 23 and 51, throwing the clutch-levers into the positions B C, one fourth-revolution of shaft 50 is obtained for each revolution of shaft 21. By means of the above-described secondary speed-changing mechanism we obtain, for instance, the following ratios of speed between the shafts 21 and 50—namely, one to two, one to one, one to one-half, and one to one-fourth. This construction provides a very simple and convenient secondary speed-changing mechanism. The shafts 21, 50, and 61, together with their gears, are mounted in a separate supplemental frame or box, separately constructed from the lathe-bed in such manner as to simplify and cheapen the assembling of parts and permit the assembling and fitting before the parts are connected to the lathe-bed, thereby minimizing the amount of work expended on the lathe-bed, which latter, owing to the size of the lathe-bed and the handling of the heavy casting and large tools employed and difficulty experienced in causing correct fitting of parts when working upon a lathe-bed, is cumbersome and expensive. Our device, however, affords a very economical, effective, and simple construction.

The box N preferably has a removable front $n^2$, held in place by bolts $n^3$, for accessibility to interior of the box, convenience in assembling and repair of parts, and protection. The removable front may carry the index-plate S. A tumbler reverse-plate O in the form of a lever is mounted to swing on the box N, as by having a bearing $o$ on the tumbler reverse-plate take about a bearing 26 on the box. The tumbler reverse-plate supports gears 81 82, intermeshing with each other, with one of the same meshing with the gear 30. The gears 81 82 may be mounted on studs 83 84, secured on the tumbler reverse-plate. A lug $o'$ extends from the tumbler reverse-plate and has a slot $o^2$, through which a bolt $o^3$ extends into the head-stock for securing the tumbler reverse-plate in adjusted position, a handle $o^4$ being provided for the more ready movement of the tumbler reverse-plate about its axis, which axis coincides with the axis of the gear 30. In the construction shown the bearing $o$ of the tumbler reverse-plate is supported upon a stationary hub of the box N, with the shaft 21 revolving within the hub. The studs 83 84 extend inwardly from the tumbler reverse-plate toward the head-stock, forming supports for the gears 81 82 between the head-stock and the tumbler reverse-plate, which latter has inwardly-extending side flanges $o^5$, and thereby forms a protecting-hood for the gears, while simultaneously performing the function of the tumbler reverse-plate, thus saving the expense of an independent protecting-hood. When the tumbler reverse-plate is swung, either gear 81 or 82 may be brought into mesh with the gear M for revolving the lead-screw in one or the other direction. A hood P is adapted to take over the gear M for protecting the same.

The primary speed-changing mechanism may be described as follows: Preferably the shaft 50 carries a gear 86, suitably splined thereto, so as to be movable lengthwise thereof and caused to rotate therewith. The gear 86 has an elongated hub upon which the rocking lever—i. e., tumbler-arm Q—is pivoted, at the free end of which latter is a gear 87, meshing with the gear 86. A shaft 88, mounted in bearings 89 90, carries a cone of gears R, with the several gears of which cone the gear 87 is adapted to selectively engage. A bearing 85 for the inner end of the shaft 50 may be connected with the bearing 89. The tumbler-arm Q has an upward extension $q$ and the latter a downward extension $q'$, which projects through a bulging portion $e$ of the bed, and a grip $q^2$, with a retaining-pin $q^3$, adapted to selectively engage any one of the series of apertures $h$ in the lathe-bed, which may be numbered to correspond with the respective gears of the cone for convenience in determining the speed of the feed-screw. S is an index-plate for indicating the result of thread and feed caused by intermeshing selectively the gears of the secondary and of the primary speed-changing mechanisms, and T an index-plate giving the resultant threads and feeds of the primary, secondary, and tertiary speed-changing mechanisms. The shaft 88 has a gear 93, meshing with a gear 94 on the feed or lead screw G. Motion may be imparted from the lead-screw, which we have shown inside the lathe-bed, to the apron mechanism by feed-rod U through the gears 95 96, mounted, respectively, on a stud 98 and the feed-rod.

The tertiary speed-changing mechanism may be described as follows: The hub of gear 52 is extended to outside of the box N, as shown at 101, and carries a gear 102, suitably secured to the hub, a washer 103 being secured to the end of the shaft 50, as by means of a bolt 104. A quadrant 105, in the form of a lever, swings about the axis of shaft 50 and is pivoted about an extended part 106 of the bearing 56. The quadrant is provided with a slot 107, in which a stud 108 is adjustably secured. A sleeve 109 encircles the stud and rotates on a bushing 100 on the stud and carries gears 110 111, the gear 110 meshing with gear 102. The shaft 21 is also extended beyond the outside of the box, as shown at 112, and has a gear 113 rigidly secured thereto, which gear meshes with gear 111. The gears 102, 110, 111, and 113 may be interchangeable or other gears substituted therefor for transmitting any desired ratio of movement from shaft 21 to shaft 50 through these gears, the stud 108 being made adjustable and the quadrant being permitted to swing about the shaft 50 for causing the gears to properly intermesh. The box N is provided with a removable side 114, which side may also carry the outer bearings for the hubs 25 and 54 and shaft 61 and be suitably secured to the box, as by means of bolts 115, and be provided with a slot 116 for receiving a T-bolt 117 for securing the quadrant 105 in adjusted position. If desired, the quadrant and stud 108 may be omitted and the shaft 61 extended to outside of the box, as shown at 108' in Fig. 11. This extension carries a sleeve 109', on which gears 110' 111' are secured for transmitting motion from shaft 21 to the shaft 50 to outside of the box. By throwing the clutch 32 into neutral position and causing the gears of the tertiary speed-changing mechanism to intermesh and interengaging clutch members 59 motion is imparted from the shaft 21 through the tertiary speed-changing mechanism to the shaft 50 through the gears 113, 111, 110, 102, and 52, or, if clutch members 58 are interengaged, through the same gears and the gears 66, 64, and 51, the latter at one-fourth the speed as when the clutch members 59 are interengaged. The speed imparted by the tertiary speed-changing mechanism is dependent on the relative size of the gears 102, 110, 111, and 113 and the position of those gears with relation to each other. Thus assuming that gear 111 is twice the size of gear 113 and gear 110 is one-half the size of gear 111 and gear 102 twice the size of gear 110, the gears 110 and 111 being mounted on the sleeve 109 and the larger of said gears in "out" position—that is, at the outer end of its stud—and the smaller in "in" position—that is, inwardly of the larger gear on the stud—certain resultant speeds are obtained, dependent on the selective interconnection of the operating parts of the secondary and primary speed-changing mechanisms, and when the smaller of gears 110 and 111 is in out position other resultant speeds are obtained, as more clearly indicated in the index-plate shown in Fig. 13.

Figures 1, 12:
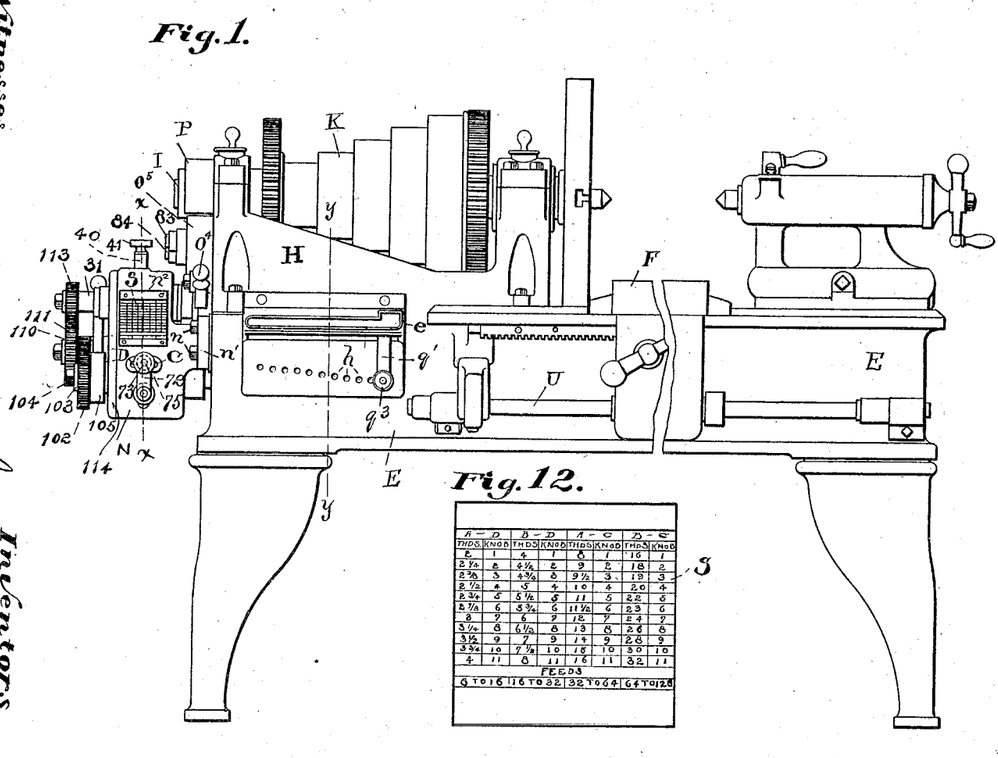
Figure 1 is a side elevation of our improved device shown in connection with a lathe, partly broken away.
Fig. 12 is a front view of the index-plate for the secondary speed-changing mechanism.
Figure 2:
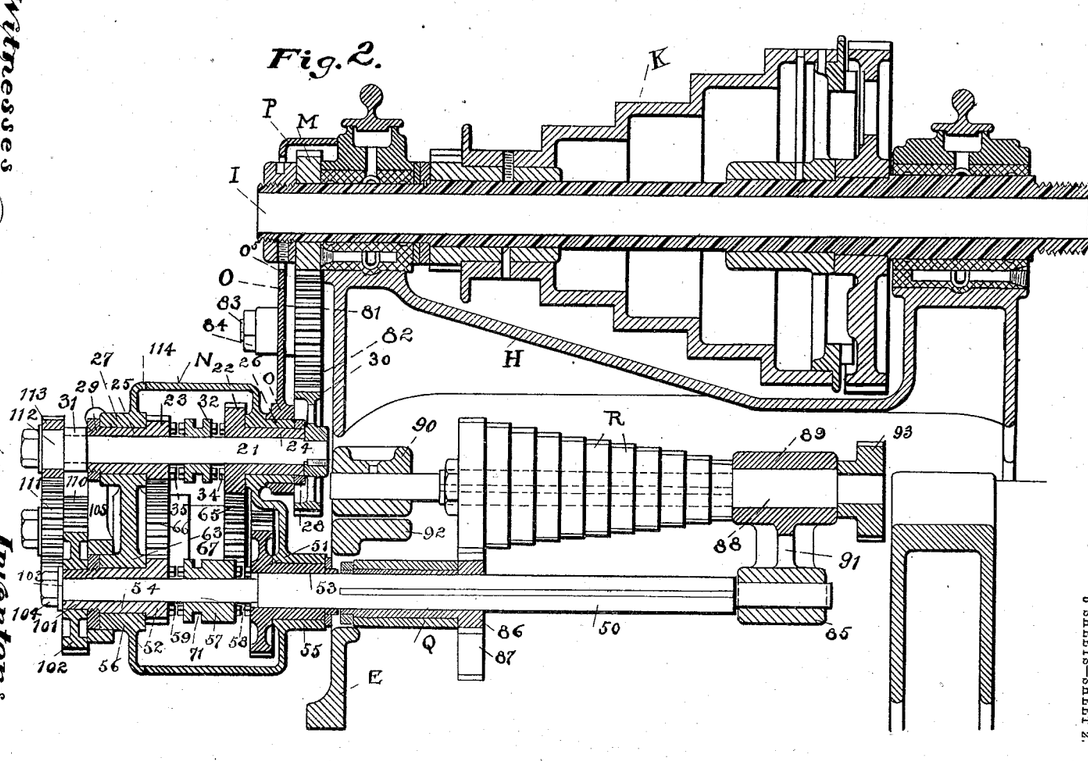
Fig. 2 is a longitudinal section of our improved device, taken on the line $zz$ of Fig. 3.
Figures 3, 4:
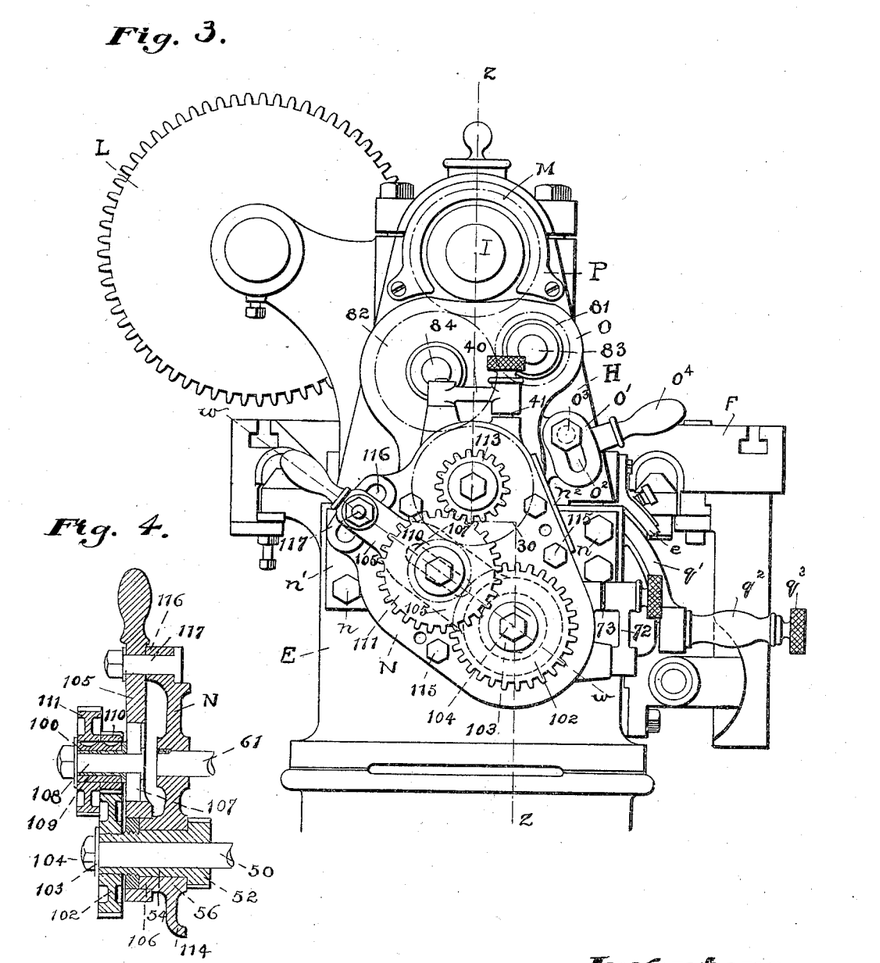
Fig. 3 is an end elevation of the same.
Fig. 4 is a detail of the tertiary speed-changing mechanism shown in cross-section on the line $ww$ of Fig. 3.
Figures 5, 8, 14:
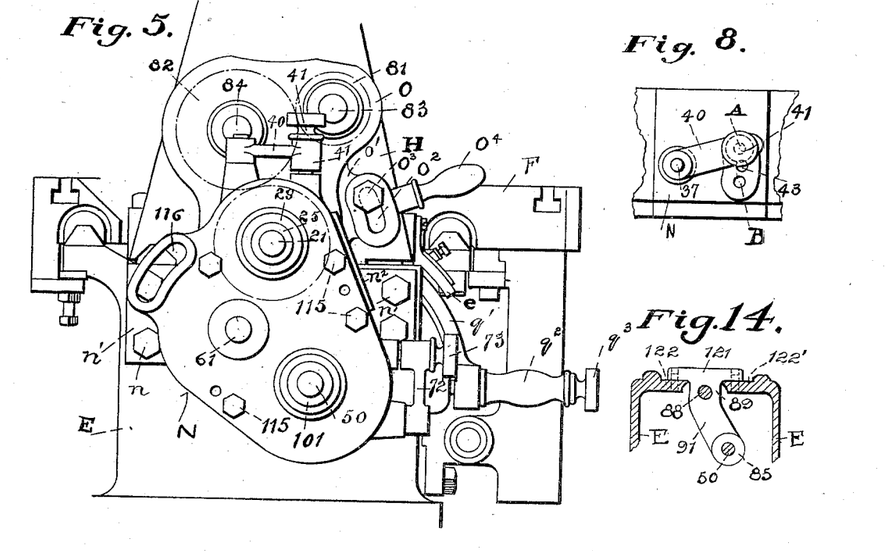
Fig. 5 is an end elevation of our improved device with the tertiary speed-changing mechanism omitted.
Fig. 8 is a detail in plan view showing the shifting mechanism on the top of the detachable box.
Fig. 14 is a detail, partly in cross-section, showing the manner of mounting the inner ends of the cone-gear and tumbler-shafts.
Figure 6:
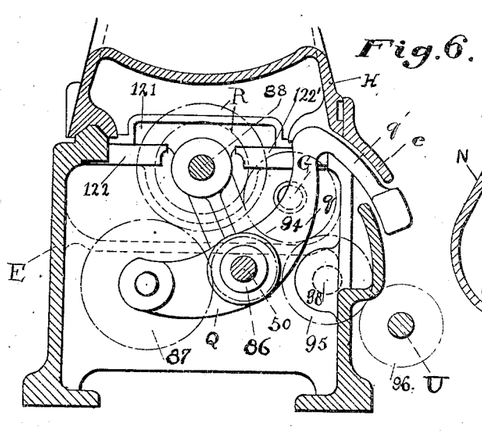
Fig. 6 is a cross-section of our improved device, taken on the line $yy$ of Fig. 1.
Figure 7:
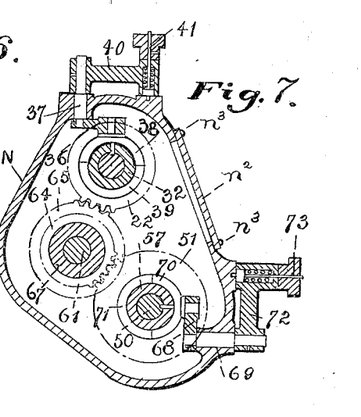
Fig. 7 is a cross-section of the secondary speed-changing mechanism, taken on the line $xx$ of Fig. 1.
Figures 9, 10, 11, 13:
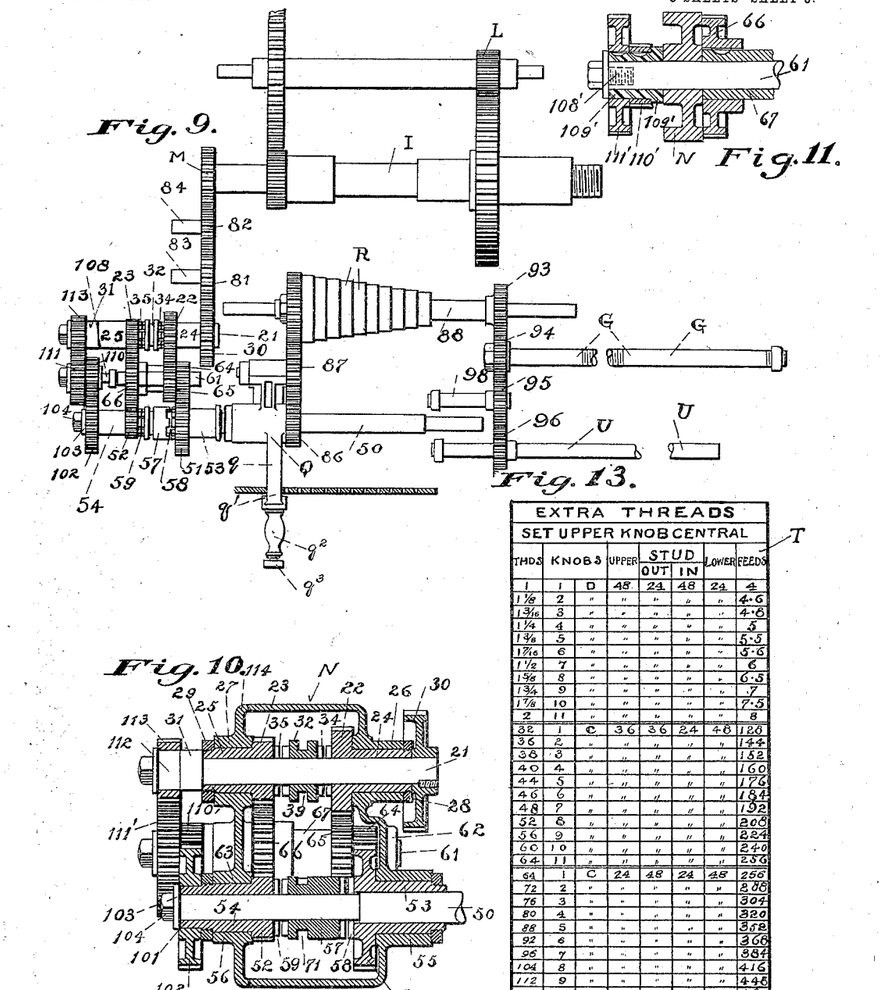
Fig. 9 is a diagrammatic view of the gearing of our improved device.
Fig. 10 is a longitudinal section of the secondary and tertiary speed-changing mechanism, taken on the line $zz$ of Fig. 3, but showing the intermediate gears of the tertiary speed-changing mechanism mounted on the outer end of the intermediate shaft of the secondary speed-changing mechanism.
Fig. 11 is a detail in vertical longitudinal section, taken on the axial line of the said intermediate shaft, showing the manner of mounting the gears of the tertiary speed-changing mechanism on the intermediate shaft of the secondary speed-changing mechanism.
Fig. 13 is a front elevation of the index-plate for the secondary and tertiary speed-changing mechanisms.

Referring to Fig. 12, the resultant threads and feeds by use of the primary and secondary speed-changing mechanisms are indicated, and it will be seen that the range of threads obtained thereby is from two to thirty-two threads per inch and the feeds from eight to one hundred and twenty-eight, and referring to Fig. 13 the threads and feeds obtainable by the tertiary speed-changing mechanism are indicated, and it will be seen that thereby the range of threads obtained increase from one to one hundred and twenty-eight threads per inch and that the feeds are increased from four to five hundred and twelve, showing the wide range of adjustment both as to threads and feeds of our improved speed-changing mechanism. Additional range of adjustment may be obtained by interchanging or substituting the gears of the tertiary speed-changing mechanism.

The inner end of the shaft 88 is journaled in the bearing 89 in a shelf 121, resting on and suitably secured to brackets 122 122'. The bearing 85 may be connected to the bearing 89 by a web 91.

We claim—

1. In a lathe, the combination, with the live-spindle and feed-screw, of a primary speed-changing mechanism with a secondary speed-changing mechanism and a tertiary speed-changing mechanism between the live-spindle and feed-screw, arranged to cause the secondary speed-changing mechanism to modify the normal speeds of the primary speed-changing mechanism and the tertiary speed-changing mechanism to modify the normal speeds of the primary and secondary speed-changing mechanisms.

2. In a lathe, the combination, with the live-spindle and feed-screw, of primary speed-changing mechanism comprising a cone of gearing arranged step-like with tumbler-gearing arranged to selectively engage the gears of the cone, a secondary speed-changing mechanism comprising clutch-gearing, and a tertiary speed-changing mechanism comprising interchangeable gearing, the speed-changing mechanisms being located between the live-spindle and feed-screw.

3. In a speed-changing mechanism, the combination of a cone of gears arranged step-like, tumbler-gearing selectively engaging with the gears of the cone, with a plurality of shafts, gearing loosely mounted thereon, clutch mechanisms between the gears and their respective shafts, and intermediate gears intermeshing with said loosely-mounted gears.

4. In speed-changing mechanism, the combination with the machine-frame, of a detachable frame, a plurality of shafts journaled in the detachable frame, gears loosely mounted on the shafts, clutches on the shafts engaging with the gears on the respective shafts, an intermediate shaft journaled in the detachable frame, gearing thereon intermeshing with the first-named gearing, and an auxiliary speed-changing mechanism interconnecting the first-named shafts.

5. In speed-changing mechanism, the combination with the machine-frame, of a detachable box having a removable side, series of gears, the box and side having bearings for the hubs of said series of gears, shafts for the respective series of gears, a clutch on each shaft for selectively connecting the gears with the shafts, one of the shafts having an extension outside the box, a gear rigidly secured thereto, and one of the gears of the other shaft having an extension outside the box, a gear rigidly secured thereto, with gearing interconnecting said gearing on said extensions, and intermediate gearing rigidly secured together and intermeshing with the first-named series of gearing.

6. In a lathe, the combination with a cone and tumbler gearing, of a box detachably secured at the end of the lathe-bed, bearings in the box, series of gears having elongated hubs journaled in the bearings, a shaft for each series of gears, with a clutch mechanism on each shaft selectively connecting the gears thereon to the shaft, and a series of differently-sized intermediate gears interconnecting the series of gears.

7. In a lathe, the combination with a cone and tumbler gearing, of a box detachably sesured at the end of the lathe-bed, bearings in the box, series of gears having elongated hubs journaled in the bearings, a shaft for each series of gears, with a clutch mechanism on each shaft selectively connecting the gears thereon to the shaft and a series of different-sized intermediate gears located within the box interconnecting the series of gears, the shaft of one series of gears having an extension outside the box and the hub of one of the gears of the other series having an extension outside the box, with gears rigidly secured to said extensions, and gearing intergearing with said last-named gears.

8. In a lathe, the combination with the bed, a cone and tumbler gearing, of a box detachably secured at the end of the lathe-bed, bearings on the box, series of gears having elongated hubs journaled in the bearings, a shaft for each series of gears, with a clutch mechanism on each shaft selectively connecting the gears thereon to the shaft, a series of different-sized intermediate gears interconnecting the series of gears, the shaft of one series of gears having an extension outside of said box, the hub of one of the other series of gears having an extension outside of said box, gears rigidly secured to said extensions, a lever swingingly mounted about the axis of one of the shafts, gearing adjustably secured to said lever and interconnecting the gears on said extensions, and means for securing said lever in place.

9. In a lathe, the combination, with the bed, the live-spindle and its gear, of a detachable box secured at the end of a lathe-bed, speed-changing mechanism located within the box comprising shafts journaled with relation to the box, a tumbler reverse-plate having a bearing on said box and swinging about the axis of one of the shafts, and gearing thereon communicating with said gear of the live-spindle.

10. In a lathe, the combination, with the bed, the live-spindle and its gear, of a detachable box secured at the end of a lathe-bed, speed-changing mechanism located within the box comprising shafts journaled with relation to the box, a tumbler reverse-plate having a bearing on said box and swinging about the axis of one of the shafts, and gearing thereon communicating with said gear of the live-spindle, a second lever swingingly mounted about the axis of the other shaft, a bearing therefor on said box, gearing for the first-named shaft, and gearing on said second lever receiving motion from said gearing of the first-named shaft.

11. In speed-changing mechanism of the character described, the combination with the machine-frame, shafts and gearing therefor, of a detachable frame, a speed-changing mechanism mounted thereon embracing a series of shafts, tumbler mechanism at each end of said series of shafts, comprising gearing adapted to intermesh with said gearing of the shafts on the machine-frame, thereby permitting the shafts and gearing of the speed-changing mechanism to be assembled in the detachable frame while detached from the machine-frame and intergeared with gearing of the machine-frame by means of tumbler-gearing for respectively receiving motion for and transmitting motion from said speed-changing mechanism.

12. In speed-changing mechanism, the combination, with the machine-frame, of a detachable frame therefor, a plurality of shafts supported by the latter, gearing thereon, bearings in the detachable frame within which the shafts revolve, the detachable frame having bosses whose axes are coincident with the axes of said bearings, a plurality of levers swingingly mounted about said bosses, and gearing on said levers meshing with the gearing on the shafts.

13. In speed-changing mechanism, the combination, with the machine-frame, of a detachable frame therefor, a plurality of shafts supported by the latter, gearing thereon, bearings in the detachable frame within which the shafts revolve, and a plurality of levers swingingly mounted, gearing on each of the latter, with the axes of bearings and of said levers coincident with each other.

14. In a lathe, the combination of a bed, a detachable box, auxiliary speed-changing mechanism for the box comprising series of gears, shafts about which the latter are loosely mounted, with clutches for interconnecting gears of the series, means for attaching the box to the lathe, a primary speed-changing mechanism, a lead-screw, a spindle, and tumbler-driving mechanism between the spindle and auxiliary speed-changing mechanism and between the auxiliary speed-changing mechanism and the lead-screw.

15. In a lathe, the combination with the bed, the spindle, the cone of gears and tumbler-gears therefor, and the lead-screw, of a detachable box, means for securing the box to the lathe, a plurality of shafts for the box, means between the latter and the lead-screw for imparting motion to the lead-screw, a plurality of gears loosely mounted on each shaft, with bearings in the box, intermediate gears between the shafts meshing with the gears on the shafts, and a clutch for each shaft for connecting gears thereon with the shaft.

16. In a lathe, the combination with the bed, the spindle, the operating-gear thereon, the cone of gears and the tumbler-gears therefor, and the lead-screw, of a detachable box, with means for firmly securing the box with relation to the bed, a plurality of shafts for the box, means between the latter and the lead-screw for imparting motion to the lead-screw, a plurality of gears loosely mounted on each shaft, with bearings in the box, a clutch for each shaft for connecting gears thereon with the shaft, a tumbler reverse-plate pivoted on the box, with gears thereon for meshing with the operating-gear, substantially as described.

17. In a lathe, the combination with the bed, the spindle, and the lead-screw, of a box extending beyond the end of the bed, with means for securing the same fixedly to the bed, two series of gears with hubs therefor journaled in the box, a pair of shafts journaled in the gears, a clutch for each shaft for connecting the gears thereon with the shaft, a cone of gears, tumbler-gears for driving the said series of gears from the spindle, and a tumbler and gear therefor meshing with the cone-gears for driving the lead-screw, substantially as described.

18. In a speed-changing mechanism, the combination of a machine-frame, a detachable frame secured thereto, a plurality of shafts rotatably mounted on the detachable frame, gears loosely mounted on the shafts, clutches on the shafts engaging with the gears on the respective shafts and clutching the gears to the shafts, an intermediate shaft rotatably mounted on the detachable frame, and gearing thereon intermeshing with the first-named gears, substantially as described.

In witness whereof we have signed our names hereto in the presence of two subscribing witnesses.

ALBERT E. ROBINSON.
CHARLES F. LAUR.

Witnesses:
  HERBERT F. HARDEN,
  AUGUST F. HERBSLEB.